(Model.)
A. A. LINTHICUM.
Tire Lifter.
No. 236,443. Patented Jan. 11, 1881.
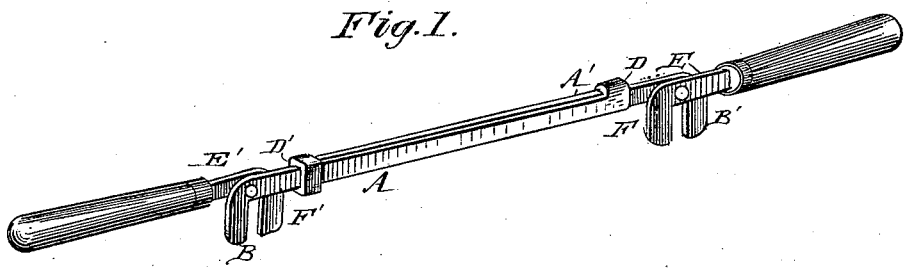
Fig. 1.
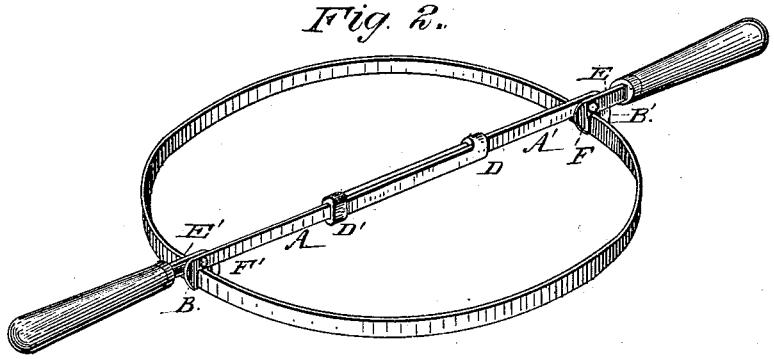
Fig. 2.
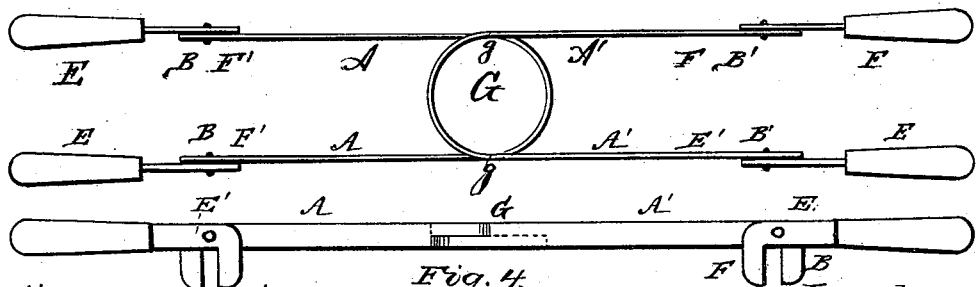
Fig. 3.
Fig. 4.
Witnesses:
Fred G. Dieterich
J. R. Littell
Inventor:
Andrew A. Linthicum
by C. A. Snow & Co.
ATTORNEYS.

UNITED STATES PATENT OFFICE.

ANDREW A. LINTHICUM, OF COLUMBIA, MARYLAND.

TIRE-LIFTER.

SPECIFICATION forming part of Letters Patent No. 236,443, dated January 11, 1881.

Application filed November 8, 1880. (Model.)

*To all whom it may concern:*

Be it known that I, ANDREW A. LINTHICUM, of Columbia, in the county of Howard and State of Maryland, have invented certain new and useful Improvements in Tire-Lifters; and I do hereby declare that the following is a full, clear, and exact description of the invention, which will enable others skilled in the art to which it appertains to make and use the same, reference being had to the accompanying drawings, which form a part of this specification.

Figure 1 is a view in perspective, and Fig. 2 is a similar view applied to a tire in lifting it. Fig. 3 is a plan view of a modification of the lifter, and Fig. 4 a longitudinal section through the same, to be hereinafter referred to.

This invention relates to tire-lifters for blacksmiths' use; and it consists in the improved features of construction and combination hereinafter fully described, and particularly pointed out in the claim.

Referring by letter to the accompanying drawings, A A' designate arms provided at their outer ends with dogs or half-jaws B B', their straight portions being provided at their inner ends with clasps or slides D D', the clasp or slide of each of said straight portions encircling the straight portion of the other slide or clasp, so that they may be extended or retracted at pleasure. To the outer ends of the arms A A' are pivoted levers E E', provided with dogs or half-jaws F F', so that when the power ends of said pivoted levers E E' are elevated the half-jaws F F' and B B' will clamp the tire between them so tightly as to enable the operators to lift the tire from the fire to the wheel on the cooling-trestle without twisting the tire, as is usual in the ordinary method. The arms A A' being capable of extension and retraction enables the operator to handle tires of different diameters, and the work can be done without danger of bending or twisting the heated tire.

Figs. 3 and 4 represent a modification of the lifter, in which the arms A A', as well as the hooks B B' F F', are duplicated. The arms A and also the arms A' are formed from a single plate of metal, curved at their inner ends so that the curved portions, when projected over each other and welded or otherwise secured together at the points $g$ $g$, form a loop, G, which fits over the hub of the wheel when placing the tire thereon.

The device is simple and inexpensive, and will commend itself without further comment.

Having thus fully described my invention, what I claim as new, and desire to secure by Letters Patent of the United States, is—

In a tire-lifter, the combination of the connected arms A A', having half-jaws or dogs B B' at their outer ends, and the pivoted levers E E', having half-jaws or dogs F F', constructed and operating substantially as and for the purpose set forth.

In testimony that I claim the foregoing as my own I have hereto affixed my signature in presence of two witnesses.

ANDREW ADGATE LINTHICUM.

Witnesses:
JNO. RIDLY CLARK,
JOHN THOMAS HARDEY.